(12) United States Patent
Maresh et al.

(10) Patent No.: US 9,697,348 B1
(45) Date of Patent: Jul. 4, 2017

(54) LOCATION SPECIFIC IMAGE BASED AUTHENTICATION

(71) Applicant: INTERNATIONAL BUSINESS MACHINES CORPORATION, Armonk, NY (US)

(72) Inventors: Mark E. Maresh, Wake Forest, NC (US); Colm Nolan, County Meath (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/332,474

(22) Filed: Oct. 24, 2016

(51) Int. Cl.
*G06F 21/36* (2013.01)
*H04L 29/06* (2006.01)

(52) U.S. Cl.
CPC ............ *G06F 21/36* (2013.01); *H04L 63/08* (2013.01); *H04L 63/107* (2013.01)

(58) Field of Classification Search
None
See application file for complete search history.

(56) References Cited

U.S. PATENT DOCUMENTS

| 9,232,046 B2 | 1/2016 | Naqvi | |
|---|---|---|---|
| 9,330,316 B2 | 5/2016 | Hicks et al. | |
| 9,412,169 B2 * | 8/2016 | Bud | G06K 9/00255 |
| 9,479,500 B2 * | 10/2016 | Bud | G06F 21/32 |
| 2012/0167199 A1 * | 6/2012 | Riddiford | G06F 3/04842 726/16 |
| 2013/0269013 A1 | 10/2013 | Parry et al. | |
| 2015/0302571 A1 | 10/2015 | Lambert | |

FOREIGN PATENT DOCUMENTS

| CN | 103745397 A | 4/2014 |
|---|---|---|
| WO | 2014172777 A1 | 10/2014 |

OTHER PUBLICATIONS

Breckon et al., "Environment Authentication through 3D Structural Analysis," Institute of Perception, Action and Behaviour School of Informatics, University of Edinburgh Edinburgh, UK, pp. 1-8.

* cited by examiner

*Primary Examiner* — Michael R Vaughan
(74) *Attorney, Agent, or Firm* — Cantor Colburn LLP; Margaret A. McNamara

(57) ABSTRACT

Embodiments are described for authenticating a login request for logging in to a user account on a host system. An example method includes receiving, by the host system, as part of the login request, an authentication image. The method also includes determining that the login request is sent from an authorized login-location, by comparing the authentication image with a reference image from the authorized login-location. The method further includes, in response to the login request being sent from the authorized login-location, facilitating access to the user account.

20 Claims, 9 Drawing Sheets

LOCATION SPECIFIC IMAGE BASED AUTHENTICATION

BACKGROUND

The present application relates to a method and system of user authentication using images.

Access to computer-based services, such as via the Internet, has become ubiquitous. For example, individuals utilize websites for multiple reasons. For certain transactions, such as secure transactions, secured access to the host site is desired to prevent unauthorized access. Typically, to access most computer services, the user must submit an alphanumeric password for authentication. The alphanumeric password system only works well if the user creates a lengthy, random, and unique password for each service he uses. But using this system effectively is very difficult for the user, because it is difficult to create passwords that are both complex and easy to remember. Therefore, many users "cheat" by using easier and less secure passwords. Doing this creates vulnerability in the user authentication system. Thus, a security system is desired to prevent unauthorized access authentication and that is both secure and convenient to the user.

SUMMARY

According to one or more embodiments, a computer implemented method for authenticating a login request for logging in to a user account on a host system includes receiving, by the host system, as part of the login request, an authentication image. The method also includes determining that the login request is sent from an authorized login-location, by comparing the authentication image with a reference image from the authorized login-location. The method further includes, in response to the login request being sent from the authorized login-location, facilitating access to the user account.

According to one or more embodiments, a system for authenticating a login request for logging in to a user account on the system includes a memory; and a processing unit coupled with the memory. The processing unit receives, as part of the login request, an authentication image. The processing unit also determines that the login request is sent from an authorized login-location, based on a comparison of the authentication image with a reference image that is captured from the authorized login-location. The processing unit, in response to determining that the login request is sent from the authorized login-location, facilitates access to the user account.

According to one or more embodiments, a computer program product for authenticating a login request for logging in to a user account on a host system includes a computer readable storage medium. The computer readable storage medium includes computer executable instructions to receive a reference image that captures a scene from an authorized login-location for the user account. The computer program product also includes instructions to generate and store reference vector data corresponding to the reference image. The computer program product also includes instructions to receive, as part of the login request, an authentication image; determine that the login request is sent from the authorized login-location by generating authentication vector data corresponding to the authentication image, determining a vector-difference by comparing the authentication vector data with the reference vector data, and in response to the vector-difference being within a predetermined range, determining that the login request is sent from the authorized login-location. The computer program product also includes instructions to facilitate access to the user account in response to the login request being sent from the authorized login-location.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Described here are embodiments that facilitate preventing unauthorized access authentication and that is both secure and convenient to a user. The one or more embodiments facilitate securing access to a host site. As such the embodiments are rooted in and/or tied to computer technology in order to overcome a problem specifically arising in the realm of computers, specifically authenticating access by a user.

In one or more examples, the embodiments facilitate validating a specific location of the user, which is used as a single-factor authentication method or as part of a multi-factor authentication method. The embodiments thus facilitate a user of a system to restrict access or usage of the system from a specific user designated location or locations by using a digital photograph of the surroundings from the specific location. For example, the user may want to allow only the user (him/herself) to log into a host system, such as a banking system (website, or application), an email system (website, or application), or any other such computer program products, and only from a user-designated location, such as the user's home-office. To address such a location-specific user access, when the user attempts to login, the user is requested to capture and post a picture from his/her viewpoint. The picture may have to be captured from a specific viewpoint from the user-designated location, in this case, the user's office. The picture from the specific viewpoint is used to uniquely identify the user's current location (for example, an open home-office door). Because only the user knows the specific viewpoint, the embodiments facilitate a location-specific user authentication.

Figure 1:
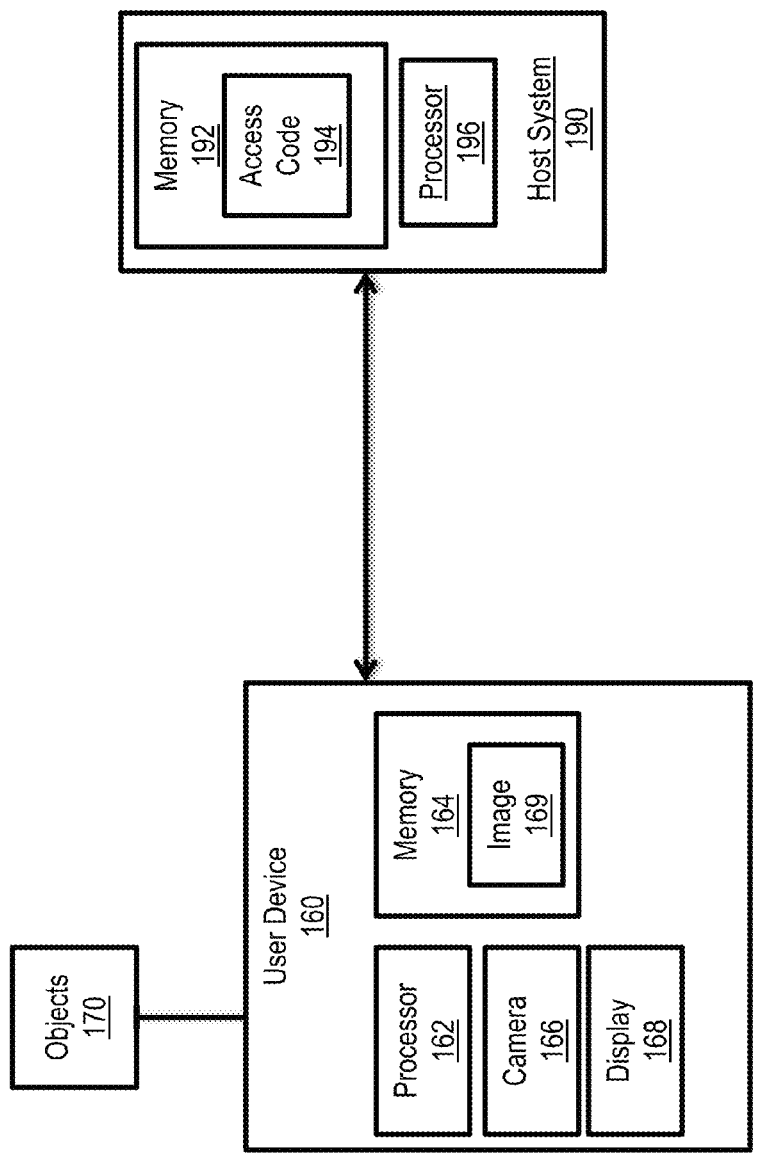
FIG. 1 illustrates a user device capturing and submitting an authentication image for accessing information stored at a host system according to one or more embodiments.

FIG. 1 illustrates a user device 160 capturing and submitting an authentication image 169 for accessing information stored at a host system 190. The authentication image 169 is a digital image, stored and transmitted in one or more predetermined file formats, such as Portable Network Graphics (PNG), Joint Photographic Experts Group (JPEG), Tagged Image File Format (TIFF) or any other such file format. The authentication image 169 includes content (that depicts a captured scene) and metadata, such as exchangeable image file format (EXIF) data, which describes parameters associated with the content and/or the capturing of the content. For example, the metadata may include a timestamp when the authentication image 169 is captured, global position satellite (GPS) coordinates where the authentication image 169 is captured, gyroscope data to identify the orientation of the user device 160 when capturing the authentication image 169, and other such ancillary metadata. The ancillary information may be captured from one or more sensors, such as a gyroscope, a GPS module, a compass, or any other sensor in the user device 160.

The user device 160 may be any type of computing device capable of capturing the authentication image 169 and communicating the authentication image 169 with the host system 190 via a network. The user device 160 may be a desktop computer, a laptop mobile computer, a personal data assistant, a smartphone, or any other such communication device. The user device 160 includes a memory 164 and a processor 162 for controlling the operation of user device 160. The user device 160 further includes a camera 166 for capturing pictures of surroundings 170. The user device 160 may also include a display 168 for displaying a user-interface. In one or more examples, the display 168 may be a touchscreen. The display 168, the camera 166, the processor 162, and the memory 164 are all in electrical communication with each other. In one or more examples, the user device 160 is a mobile device such as a smartphone and the respective memories and processors run an application for creating and submitting the authentication image 169.

The host system 190 may be a remote system, such as a website, a computer program product, or any other such system that requires a password or other security feature for access. The host system 190 includes a processor 196 and associated memory 192, which stores access codes 194 that are utilized to provide access to the host system 190. The access codes 194 may include images, metadata, user-credentials, and other types of data, which may be stored in a secure form, such as using encryption, and/or hashing. For example, the host system 190 may be server computer or any other communication device that hosts a website, or portal (such as desktop or mobile application) for accessing an account at a financial institution such as a bank, and the accessible features may include checking balances, transferring funds, depositing money, or paying bills.

Figure 2:
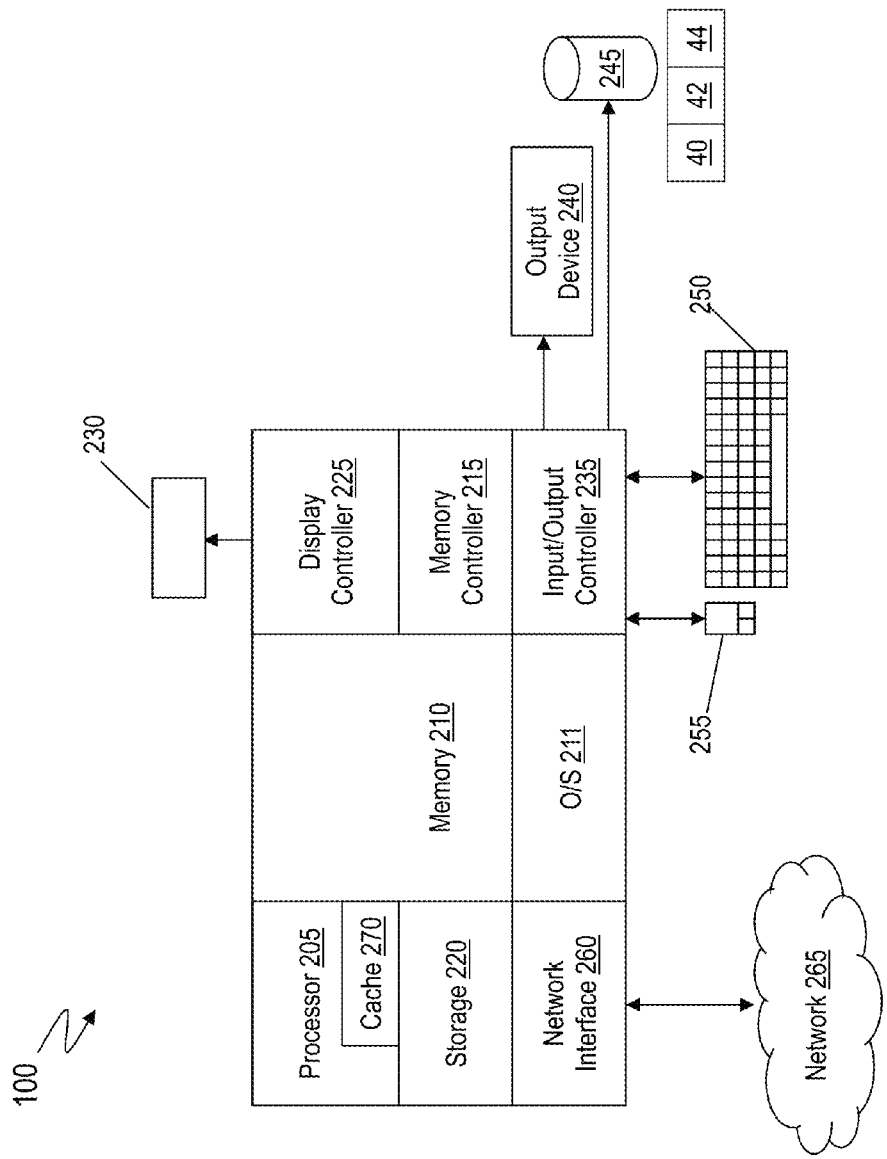
FIG. 2 illustrates an example communication device according to one or more embodiments.

FIG. 2 illustrates an example communication device 100. The communication device 100 may depict the user device 160 and the host system 190, either or both. The communication device 100 may be a communication apparatus, such as a computer. For example, the communication device 100 may be a desktop computer, a tablet computer, a laptop computer, a phone, such as a smartphone, a server computer, or any other device that communicates via a network 265. The communication device 100 includes hardware, such as electronic circuitry.

The communication device 100 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (gyroscope 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the communication device 100, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The communication device 100 may further include a display controller 225 coupled to a user interface or display 230. In some embodiments, the display 230 may be an LCD screen. In other embodiments, the display 230 may include a plurality of LED status lights. In some embodiments, the communication device 100 may further include a network interface 260 for coupling to a network 265. The network 265 may be an IP-based network for communication between the communication device 100 and an external server, client and the like via a broadband connection. In an embodiment, the network 265 may be a satellite network. The network 265 transmits and receives data between the communication device 100 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
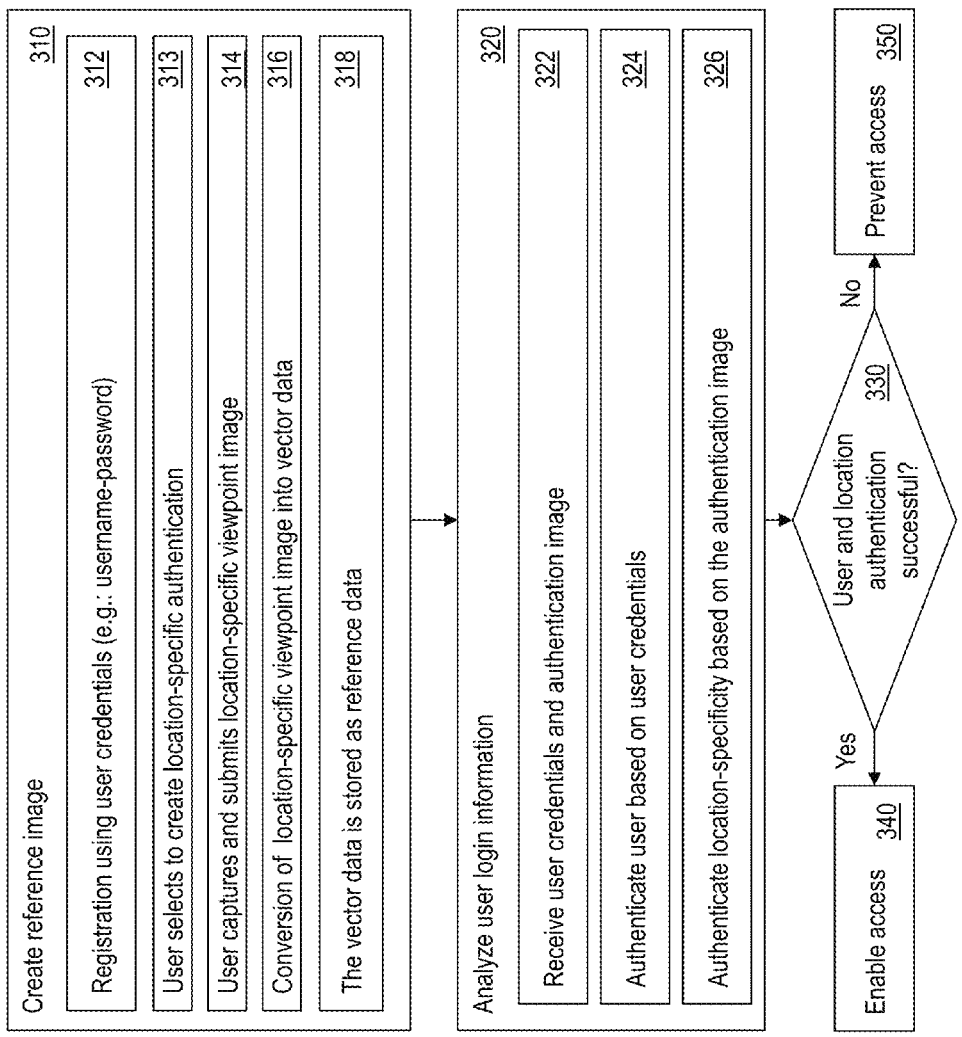
FIG. 3 illustrates a flowchart of an example method for authenticating location-specific user access according to one or more embodiments.

FIG. 3 illustrates a flowchart of an example method for authenticating location-specific user access. In one or more examples, a reference image is first created, as shown at 310. In one or more examples, the creation of reference image is performed during registration of the user with the host system 190 using user-credentials (e.g.: username-password), as shown at 312. The registration may include any other steps that the host system 190 mandates during registering a new user for the first time, such as entering personal, and/or demographic information. The user selects to use a location-specific authentication, as shown at 313. In response, the user is requested to designate a login-location from where the user intends to login to the host system 190, such as office, bedroom, kitchen, home, or any other. The user is further requested to capture and submit a location-specific viewpoint image as the reference image, as shown at 314.

Alternatively or in addition, the user may designate an authorized login-location after creating the user account. For example, the user may select an option in the host system 190 that facilitates the user to designate a login-location as the authorized login-location, and send a captured location-specific viewpoint image as the reference image for that authorized login-location. In one or more examples, the user may designate more than one authorized login-locations for the user account in the host system.

In one or more examples, the host system 190 enforces that the reference image include a permanent structure, such as a door, a window, a pillar or any other permanent structure that does not change shape substantially over time. Additionally, in one or more examples, the reference image may have depict an indoor scene.

The location-specific viewpoint image is a digital image, similar to the authentication image 169 described herein. For example, the user captures and submits the location-specific viewpoint image using the user device 160. The location-specific viewpoint image captures a specific scene from a specific viewpoint from the user designated login-location. For example, the location-specific viewpoint image may be an image capturing a door of an office that the user designates as the login-location (see FIG. 4B). The location-specific viewpoint image is thus the reference image that is used as a "master photo" to authenticate the user's location at future logins.

Figure 4:
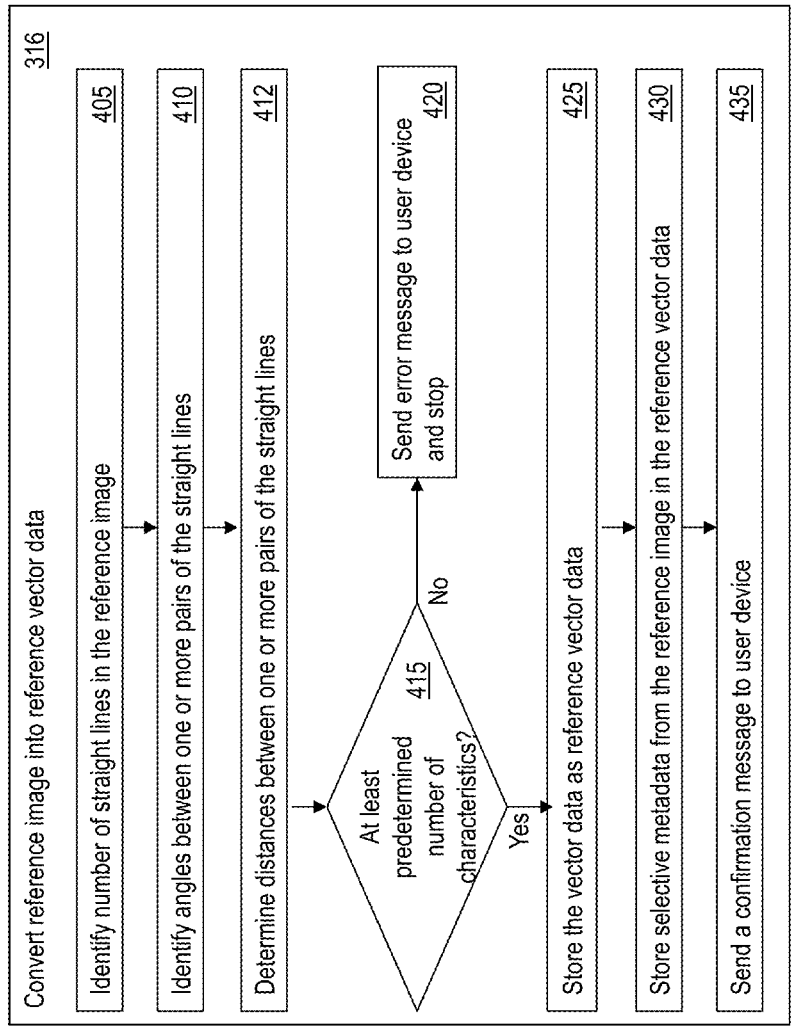
FIG. 4 illustrates a flowchart of an example method for converting a reference image into reference vector data according to one or more embodiments.
Figure 5B:
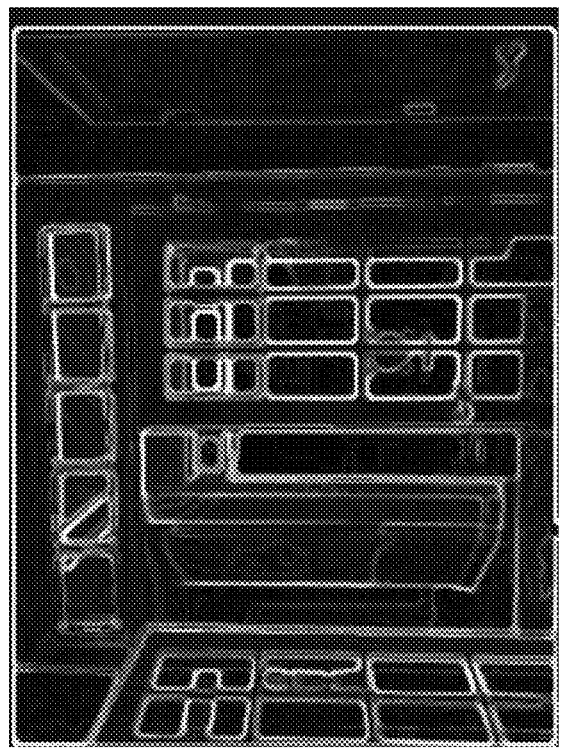
FIG. 5A and FIG. 5B depict examples of a reference image and lines identified in the reference image respectively, according to one or more embodiments.
Figure 5A:

In one or more examples, the reference image submitted during the registration is converted into vector form and stored as reference vector data, as shown at 316 and 318. FIG. 4 illustrates a flowchart of an example method for converting the reference image into reference vector data, as shown at 316. In one or more examples, the method includes identifying a number of straight lines in the reference image, as shown at 405. For example, the straight lines may be edges that are identified in the reference image. The corresponding vector data includes identification of at least a subset of the identified straight lines. For example, starting and ending coordinates of the straight lines may be stored in one or more examples. Alternatively or in addition, a starting coordinate and a length of the line may be stored. It is understood that any other manner of storing a straight line in the vector data may be used in this regard. FIG. 5A and FIG. 5B depict examples of a reference image (5A) and lines identified in the image (5B).

Referring back to FIG. 4, the vector analysis may further include determining angles between one or more pairs of the straight lines that are identified, as shown at 410. In one or more examples, the method may include identifying significant vectors from the set of straight lines that are identified, and determining the angles between the significant vectors. In one or more examples, the significant vectors may be identified as the straight lines that are edges of permanent structures in the reference image. For example, the permanent structures in the reference image may be determined from a predetermined set of structures, such as doors, windows, buildings, pillars, and the like. The angles between one or more pairs of lines from the significant vectors may be determined using graphical analysis. Further yet, the vector analysis may include determining distances between one or more pairs of the straight lines, such as the significant vectors, as shown at 412. Thus, the reference vector data corresponding to the reference image records vector characteristics of the reference image, such as a number of significant vectors in the reference image, angles between one or more pairs of the significant vectors, and distances between one or more pairs of the significant vectors. Additional vector characteristics may be recorded in other examples.

In one or more examples, the method includes ensuring that at least a predetermined number of vector characteristics of the reference image are recorded in the reference vector data, as shown at 415. For example, the method may ensure that minimum requirements are met; for example, 10+ lines, 5+ distance measurements, and 5+ angle measurements, are recorded in the reference vector data. In case the minimum requirements are not met, the method may include sending an error message to the user device 160 and stopping the user registration process, as shown at 420. The user registration process may resume upon the user device 160 transmitting a different reference image, which is converted into vector data as described herein. Once the reference image received meets the minimum requirements for the vector data characteristics, the vector data is stored as the reference vector data, as shown at 425.

In one or more examples, metadata of the "master photo," such as timestamp, gyroscope data, and other metadata that considered together, uniquely identifies the reference image is stored as part of the reference vector data, as shown at 430. In one or more examples, the reference vector data is encrypted, and/or stored in a proprietary manner, which prevents an outside party from reconstructing the reference image. The method may further include sending a confirmation to the user device 160 that the reference image has been converted into reference vector data for authenticating the location-specificity of future user logins, as shown at 435.

Referring back to FIG. 3, when the user tries to login to the host system 190 at a future time, the method for location-specific user authentication further includes analysis of user login information that includes the authentication image 169, as shown at 320. The authentication analysis includes receiving the user login information, which includes user-credentials (such as username-password) and the authentication image 169, as shown at 322. The analysis further includes authenticating the user credentials, using one or more known techniques in the art, as shown at 324. In addition, the analysis includes authenticating location-specificity of the login attempt based on the authentication image 169, and the reference vector data, as shown at 326.

Figure 6:
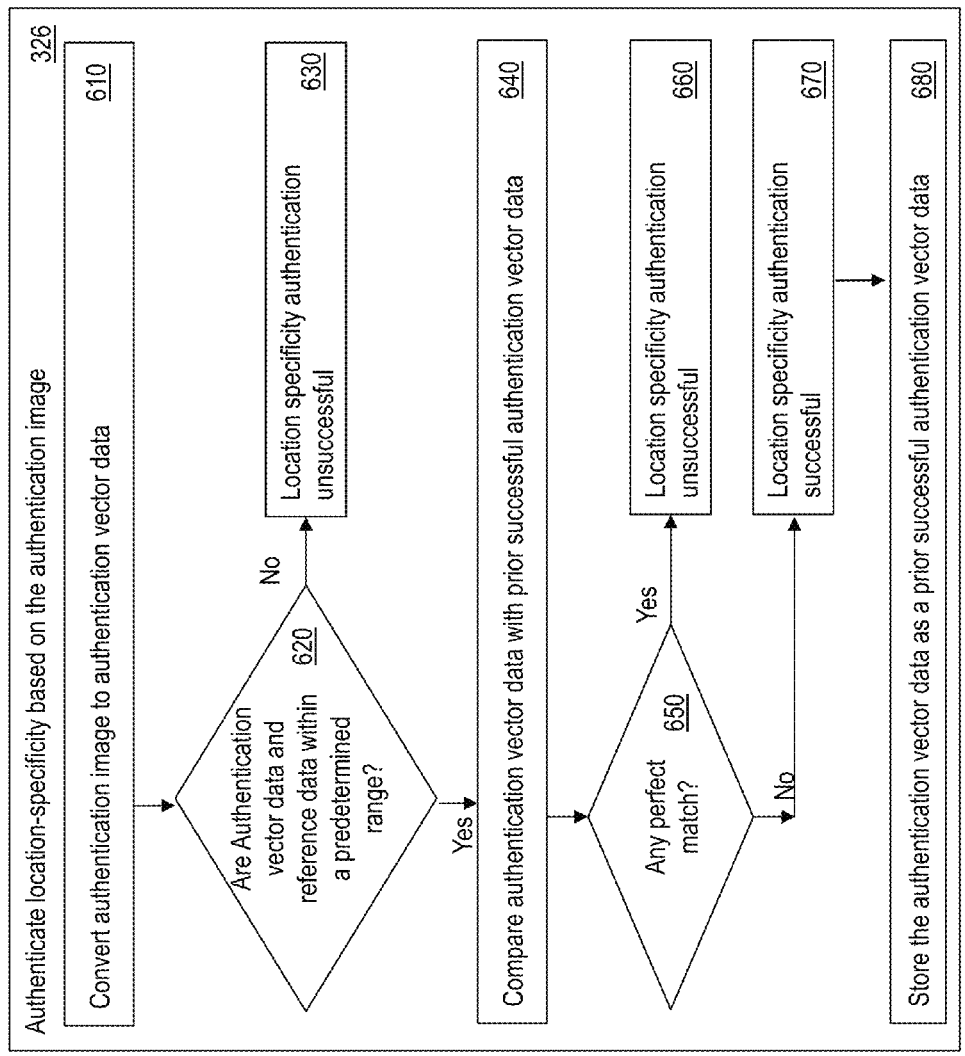
FIG. 6 illustrates a flowchart of an example method for authenticating a location-specificity of the login attempt according to one or more embodiments.
Figure 7A:
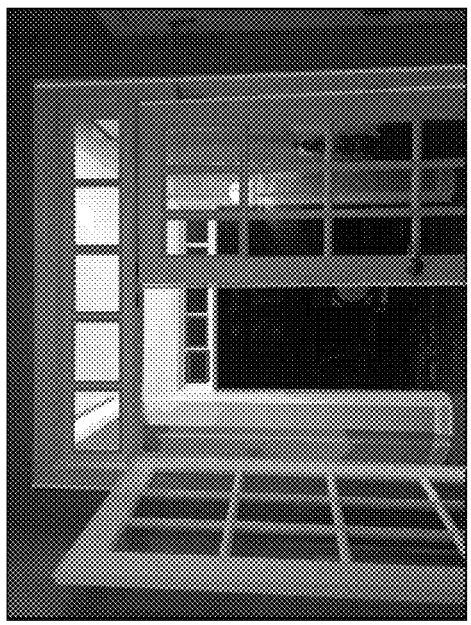
FIG. 7A and FIG. 7B respectively depict examples of an authentication image and corresponding identified vectors according to one or more embodiments.
Figure 7B:
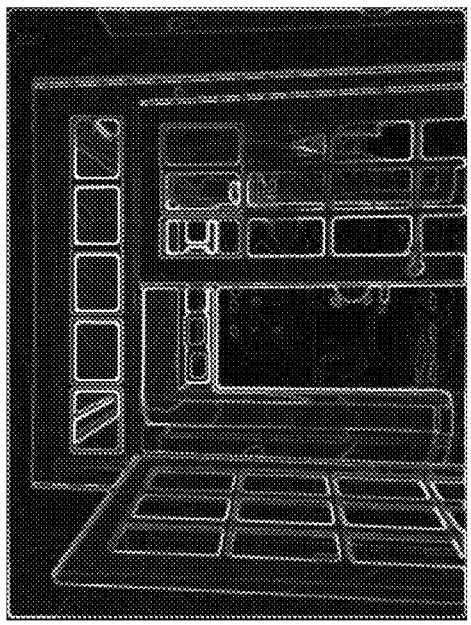

FIG. 6 illustrates a flowchart of an example method for authenticating the location-specificity of the login attempt, as shown at 326. The method includes converting the authentication image 169 into vector form, as shown at 610. Converting the authentication image 169 to vector form uses the same algorithm that is used to convert the reference image into vector form (see FIG. 4). For example, the conversion includes determining straight lines in the authentication image, and determining significant vectors from the identified straight lines. Further, angles and distances between the one or more significant vectors are determined. Accordingly, the authentication image 169 is converted into authentication vector data, similar to converting the reference image into reference vector data. FIG. 7A and FIG. 7B respectively depict examples of the authentication image 169 and corresponding identified vectors. In one or more examples, a numerical model may be built based on the vector data.

Figure 7C:
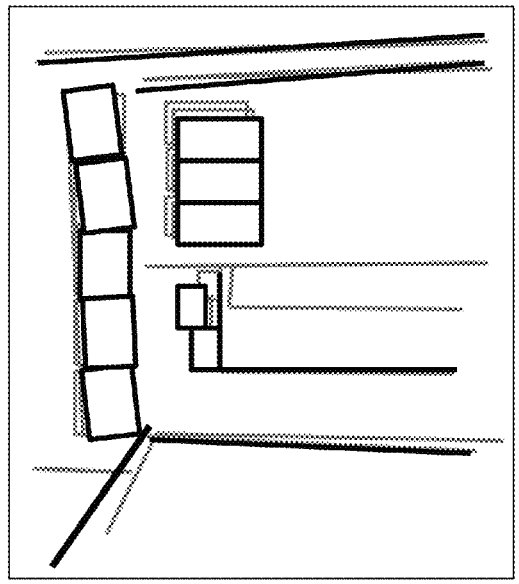
FIG. 7C illustrates an example comparison of authentication vector data (dark lines) and the reference vector data (light lines) according to one or more embodiments.

Referring back to FIG. 6, the authentication vector data corresponding to the authentication image 169 is compared with the reference vector data, as shown at 620. For example, the numbers of lines, the angles between corresponding vectors, and distance between the significant vectors, from the two sets of vector data are compared. If a difference between the two vector data is not within a predetermined range, the authentication of the location-specificity is considered unsuccessful, as shown at 630. FIG. 7C illustrates an example comparison of authentication vector data (dark lines) and the reference vector data (light lines). In one or more examples, if the vector data result in a perfect match, the different is not within the predetermined range, and the authentication is deemed to be unsuccessful, and the user access is rejected. A perfect match indicates that a stored copy of the reference image was used as the authentication image 169, accordingly access is prevented.

Alternatively, if the difference between the authentication vector data and the reference vector data is within the predetermined range, the authentication vector data is further compared with previous authentication vector data that resulted in successful logins, as shown at 640. For example, a predetermined number of previous authentication vector data from previous login attempts that resulted in successful authentication of the location-specificity are stored and compared to ensure that a stored image is not being used as the authentication image 169. If a perfect match is found when comparing the current authentication vector data with the previous authentication vector data, the authentication of the location-specificity is considered unsuccessful, as shown at 660. Else, if the current authentication vector data does not perfectly match with any of the previous authentication vector data, the authentication of the location-specificity is considered successful, as shown at 670. In one or more examples, the authentication vector data is stored as a prior successful authentication vector data, as shown at 680. Additionally, in one or more examples, the metadata stored in the reference data vector is compared with the metadata of the authentication image 169 to ensure that the authentication image 169 is not the same image as the reference image.

Thus, if the authentication vector data is a perfect match to any stored vector data, such as the reference vector data, or from previous logins, the user access is rejected. Instead, if the vector data matches the reference vector data, within a predetermined threshold (but not exactly), the authentication image is confirmed as being unique, and a "fresh" or original photo, and the user is allowed access to the host system 190. The predetermined threshold takes into account that the authentication image 169 may be captured from approximately the same viewpoint as the reference image, and not exactly the same viewpoint.

The embodiments described herein thus facilitate validating a request for access to the host system 190 by authenticating, in addition to the user-credentials, that the request is being sent from the user-designated location.

Figure 8:
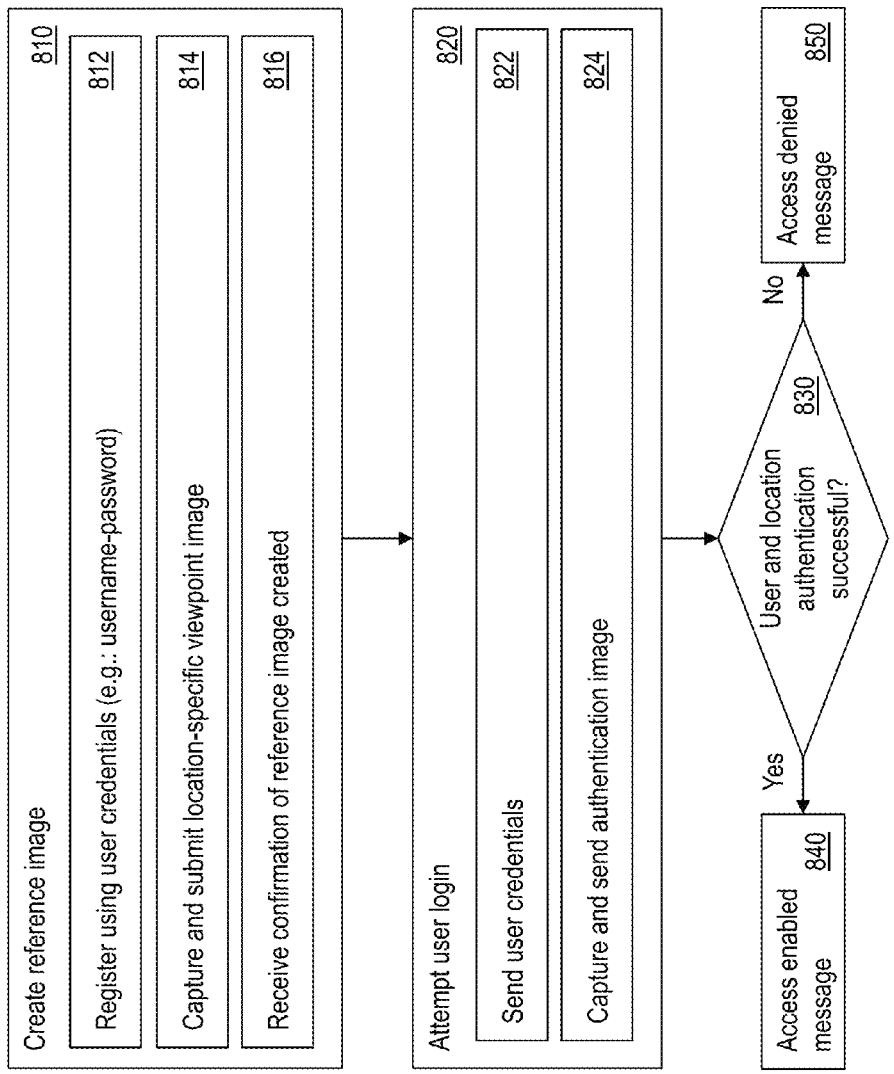
FIG. 8 illustrates a flowchart of an example method implemented by a user device to facilitate a user to register for location-specific authentication and use the location-specific authentication according to one or more embodiments.

FIG. 8 illustrates a flowchart of a method implemented by the user device 160 to facilitate the user to register for location-specific authentication and use the location-specific authentication. In one or more examples, the user device 160 is used to register for the location-specific authentication with the host system 190. The user creates a reference image for the location-specific authentication via the user device 160, as shown at 810. For example, the user creates a new user account by providing user credentials for the account via the user device 160, as shown at 812. The user further captures a location-specific viewpoint image, which is used as the reference image, via the user device 160, as shown at 814. The user device 160 sends the reference image to the host system 190, as shown at 814. The user device 160 displays a confirmation received from the host system 190 that is indicative that the reference image has been created, as shown at 316. In case the reference image does not meet predetermined minimum requirements regarding the vector data characteristics, the user device 160 receives an error message from the host system 190, as described herein. In such a case, the user device 160 repeats the operations of capturing a location-specific viewpoint image and sending the image to the host system, as shown at 316. In one or more examples, the user device 160 includes, in the metadata, of the reference image, a timestamp, a GPS location information, a gyroscope information, and other such information that facilitates identifying the reference image uniquely.

The user device 160 further facilitates the user to attempt to login to the host system 190, as shown at 820. In one or more examples, the user device sends user credentials for logging into the account to access data/features of the host system 190, as shown at 822. In addition, the user device 160 captures and sends the authentication image 169 to the host system 190, as shown at 824. In response, the user device 160 receives an indication from the host system 190 regarding the success of the authentication, as shown at 830. If the authentication is successful, the user device 160 is enabled access to the data/features on the host system 190, as shown at 840. In one or more examples a message may be displayed by the user device 160 indicating that the authentication was successful, as shown at 840. If the authentication fails, the user device 160 displays a message indicating the failure and is denied access to the data/features of the host system 190, as shown at 850.

As described earlier, the authentication may fail in case a stored image is sent (instead of a newly captured image), as the authentication image, as the host system 190 deems the authentication unsuccessful. Further yet, the authentication may fail in case incorrect user credentials are sent. in addition, the authentication may fail in case an incorrect authentication image is sent that differs from the reference image by more than the predetermined threshold.

Figure 9:
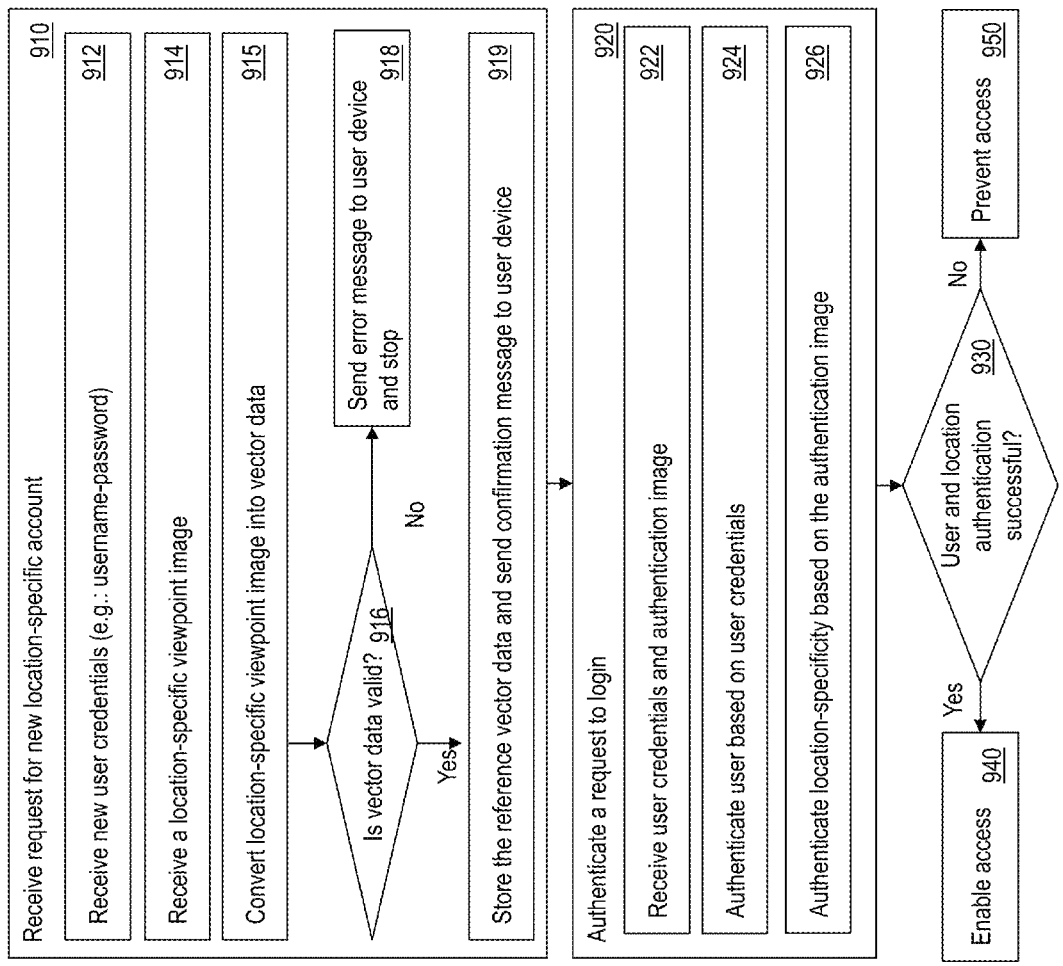
FIG. 9 illustrates a flowchart of an example method for location-specific authentication that is implemented by a host system according to one or more embodiments.

FIG. 9 illustrates a method for location-specific authentication that is implemented by the host system 190. The host system 190 facilitates the user to create the new user account and select to use the location-specific authentication described herein, which facilitates the user to login to the host system 190 only from a designated location. In one or more examples, the host system 190 receives a request for the new user account, as shown at 910. As part of the request, the host system 190 receives new user credentials for the new account, as shown at 912. The host system 190 further receives a location-specific viewpoint image, as a reference image from the user device 160, as shown at 914. The reference image is an indication of a login-location that the user wants to designate for logging into the host system 190. The reference image captures a surrounding of the user at the specific location and from a specific viewpoint.

The host system 190 determines the reference vector data corresponding to the reference image, as shown at 915. The host system 190 determines if the reference vector data is valid, as shown at 916. For example, the host system 190 ensures that the reference vector data has at least a minimum number of vector data characteristics that can be used for comparing with authentication vector data that is received at a future time. In case the reference vector data does not meet the minimum requirements, the host system 190 sends an error message to the user device 160, and stops the registration of the new account, as shown at 918. In one or more examples, the host system 190 waits for the user device 160 to resend another reference image. If the reference vector data meets the minimum requirements that are predetermined, the host system stores the reference vector data and sends a confirmation message to user device 160 indicative of successfully registering the reference image for the login-location, as shown at 919.

The host system 190, may be at a later time, authenticates a request to login to the user account, as shown at 920. As part of the request, the host system 190 receives user credentials and the authentication image 169, as shown at 922. The authentication may include validating the user credentials, such as the username-password combination, or any other elements of the user credentials, such as date-of-birth, postal code, and so on. In one or more examples, in response to the validation of the user credentials failing, the host system denies the user device 160 from access to the host system 190.

The host system 190 further authenticates a location-specificity of the request based on the authentication image 169. As described herein, the host system 190 determines the authentication vector data corresponding to the authentication image 169 and validates the location-specificity by comparing the authentication vector data with the reference vector data, and previous authentication vector data, as shown at 926 (See FIG. 6). The authentication vector data may be stored for future comparisons.

If both the user credential and the location-specificity validation is successful, the host system enables the user device 160 to access the data/features of the host system 190, else the host system denies the user device 160 access to the data/features, as shown at 930, 940, and 950.

In one or more examples, the host system 190 facilitates the user device 160 to designate more than one login-locations using the method described herein.

Accordingly, the embodiments described herein facilitate a user and/or a host system to enforce logging into the host system from a user-designated login-location. As described herein, when registering a new account with the host system, the user designates a login-location and takes a picture of a viewpoint from the login-location. The picture is transmitted to the host system, as a reference image. The host system analyzes the reference image for identifying recognizable vectors and stores reference vector data associated with the login-location for the user. In one or more examples, the host system ensures that the reference image contains at least a predetermined number of vector characteristics to identify one or more permanent structures in the reference image. For subsequent login requests, the user captures and sends authentication images (pictures) taken from substantially the same viewpoint at the login-location. If authentication vector data corresponding to the authentication image does not match the reference vector data within a predetermined range, the login request is denied. The host system ensures that the authentication image does not match the reference image, or an earlier successfully logged in image, 100%. Thus, the host system ensures that the reference image is not stolen and/or re-used). The host system thus allows minor variations in the user's composition of the authentication image to enable authentication.

The embodiments described herein thus provide a significant layer of security, since an unauthorized user would need to have physical access to the login-location from where the authentication image is to be taken. Further, because the embodiments described herein includes storing the user's previous (n) login images, and rejecting re-use of an identical image, the embodiments also prevent the use of copies of previous images for logging into the host system.

Accordingly, the embodiments described herein facilitate validation by location, making it very difficult, if not impossible for an unauthorized user who has access only to user-credentials to gain access to the host system, without being at the authorized physical login-location(s). Further, by using an algorithm for "near match," that is denying perfect matches, the embodiments prevent someone from using a previously saved photo for subsequent access, requiring that a fresh photo be used for each login. In one or more examples, for subsequent logins, the user may use the location-authentication only for logging into the host system, without other user credentials, such as username, password, and the like.

The present embodiments may be a system, a method, and/or a computer program product at any possible technical detail level of integration. The computer program product may include a computer readable storage medium (or media)

having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present embodiments have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for authenticating a login request for logging in to a user account on a host system, the method comprising:
   receiving, by the host system, a reference image that captures a location-specific viewpoint from a perspective of a user in an authorized login-location;
   receiving, by the host system, as part of the login request, an authentication image;
   determining that the login request is sent from the authorized login-location, by comparing the authentication image with the reference image; and
   in response to the login request being sent from the authorized login-location, facilitating access to the user account.

2. The computer implemented method of claim 1, further comprising, denying access to the host system in response to the login request not being sent from the authorized login-location.

3. The computer implemented method of claim 1, wherein comparing the authentication image with the reference image comprises:
   determining authentication vector data in the authentication image; and
   comparing the authentication vector data with reference vector data corresponding to the reference image.

4. The computer implemented method of claim 1, wherein the reference image is received when the user account is created.

5. The computer implemented method of claim 1, wherein the reference image is received in response to the authorized login-location being associated with the user account.

6. The computer implemented method of claim 1, further comprising determining authentication vector data in the authentication image, wherein the authentication vector data comprises identification of straight lines in the authentication image and measurements of angles between one or more pairs from the straight lines.

7. The computer implemented method of claim 1, further comprising determining authentication vector data in the authentication image, wherein the authentication vector data comprises identification of straight lines in the authentication image and measurements of distances between one or more pairs from the straight lines.

8. The computer implemented method of claim 1, further comprising, determining that the authentication image is a previously stored image in response to the authentication image entirely matching the reference image.

9. The computer implemented method of claim 1, wherein determining that the login request is sent from the authorized login-location further comprises comparing the authentication image with one or more previous authentication images that resulted in successful logins to the user account.

10. A system for authenticating a login request for logging in to a user account on the system, the system comprising:
    a memory; and
    a processing unit coupled with the memory, the processing unit configured to:
      receiving a reference image that captures a location-specific viewpoint from a perspective of a user in an authorized login-location;
      receive, as part of the login request, an authentication image;
      determine that the login request is sent from the authorized login-location, based on a comparison of the authentication image with the reference image; and
      in response to determining that the login request is sent from the authorized login-location, facilitate access to the user account.

11. The system of claim 10, wherein the comparison of the authentication image with the reference image comprises:
    determining authentication vector data in the authentication image; and
    comparing the authentication vector data with reference vector data corresponding to the reference image.

12. The system of claim 10, wherein the reference image is received when the user account is created.

13. The system of claim 10, wherein the reference image is received in response to the authorized login-location being associated with the user account.

14. The system of claim 10, wherein the processor is further configured to determine authentication vector data corresponding to the authentication image, wherein determination of the authentication vector data comprises:
    identification of straight lines in the authentication image;
    identification a subset of the straight lines as significant vectors of the authentication image; and determination of angles between one or more pairs of straight lines from the significant vectors of the authentication image.

15. The system of claim 10, wherein the processor is further configured to determine authentication vector data corresponding to the authentication image, wherein determination of the authentication vector data comprises:
  identification of straight lines in the authentication image;
  identification a subset of the straight lines as significant vectors of the authentication image; and
  determination of distances between one or more pairs of straight lines from the significant vectors of the authentication image.

16. The system of claim 10, wherein the processor is further configured to determine that the authentication image is a previously stored image in response to the authentication image entirely matching the reference image.

17. The system of claim 10, wherein for determining that the login request is sent from the authorized login-location, the processor is further configured to compare the authentication image with one or more previous authentication images that resulted in successful logins to the user account.

18. A computer program product for authenticating a login request for logging in to a user account on a host system, the computer program product comprising a non-transitory computer readable storage medium, the non-transitory computer readable storage medium comprising computer executable instructions, wherein the computer readable storage medium comprises instructions to:
  receive a reference image that captures a location-specific viewpoint from a perspective of a user in an authorized login-location;
  generate and store reference vector data corresponding to the reference image;
  receive, as part of the login request, an authentication image;
  determine that the login request is sent from the authorized login-location by:
    generating authentication vector data corresponding to the authentication image;
    determining a vector-difference by comparing the authentication vector data with the reference vector data; and
    in response to the vector-difference being within a predetermined range, determining that the login request is sent from the authorized login-location; and
  facilitate access to the user account in response to the login request being sent from the authorized login-location.

19. The computer program product of claim 18, wherein the reference image is received when the user account is created.

20. The computer program product of claim 18, wherein generating the authentication vector data and generating the reference vector data, further comprises:
  identifying of straight lines in the respective image;
  identifying a subset of the straight lines as significant vectors of the respective image;
  determining angles between one or more pairs of straight lines from the significant vectors; and
  determining distances between the one or more pairs of straight lines from the significant vectors.

* * * * *